United States Patent

Matsuo et al.

[11] Patent Number: 5,964,679
[45] Date of Patent: Oct. 12, 1999

[54] INTERNALLY MOUNTED BICYCLE TRANSMISSION USING ROLLER CLUTCHES

[75] Inventors: Nobuyuki Matsuo; Hiroyuki Okochi, both of Shimonoseki, Japan

[73] Assignee: Shimano, Inc., Osaka, Japan

[21] Appl. No.: 08/993,938

[22] Filed: Dec. 18, 1997

Related U.S. Application Data

[62] Division of application No. 08/430,835, Apr. 28, 1995, Pat. No. 5,785,625.

[30] Foreign Application Priority Data

Apr. 28, 1994 [JP] Japan .................................. 6-092456

[51] Int. Cl.[6] .................................................. B62M 11/18
[52] U.S. Cl. ........................... 475/297; 475/298; 475/296
[58] Field of Search ..................... 475/296, 297, 475/298, 286; 192/41 R

[56] References Cited

U.S. PATENT DOCUMENTS

| | | | |
|---|---|---|---|
| 2,441,989 | 5/1948 | Brown ........................................ | 74/275 |
| 2,851,907 | 9/1958 | de Normanville ........................ | 74/781 |
| 2,899,030 | 8/1959 | Douglas et al. ............................ | 192/6 |
| 3,166,171 | 1/1965 | Schwerdofer et al. .................... | 192/64 |
| 3,299,745 | 1/1967 | Toplis ........................................ | 74/750 |
| 3,366,745 | 1/1968 | Shimano .................................... | 192/6 |
| 3,828,627 | 8/1974 | Schwerdhofer .......................... | 475/297 |
| 4,147,243 | 4/1979 | Segawa et al. ...................... | 475/297 X |
| 4,147,244 | 4/1979 | Segawa et al. ...................... | 475/297 X |
| 4,240,533 | 12/1980 | Fukui .................................. | 475/297 X |
| 4,323,146 | 4/1982 | Fukui ...................................... | 192/6 A |
| 4,373,407 | 2/1983 | Okubo .............................. | 192/48.92 X |
| 5,078,664 | 1/1992 | Nagano .................................... | 475/297 |
| 5,083,991 | 1/1992 | Yang ........................................ | 475/259 |
| 5,129,711 | 7/1992 | Chen ........................................ | 301/105 |
| 5,372,227 | 12/1994 | Kinoshita et al. ........................ | 192/45 |
| 5,445,573 | 8/1995 | Nurnberger .......................... | 475/297 X |

FOREIGN PATENT DOCUMENTS

| | | | |
|---|---|---|---|
| 0 531608 A2 | 3/1993 | European Pat. Off. ....... | B62M 11/18 |
| 3732977 A1 | 4/1989 | Germany ....................... | B62M 11/16 |
| 1004766 | 9/1965 | United Kingdom . | |

OTHER PUBLICATIONS

European Search Report for EP 95302851.1, dated Feb. 26, 1996.

*Primary Examiner*—Khoi Q. Ta
*Attorney, Agent, or Firm*—James A. Deland

[57] ABSTRACT

A bicycle transmission includes a shaft, a driving part supported about the shaft for coupling to the input part, a driven part supported about the shaft for coupling to the output part, and a planetary gear mechanism disposed between the driving part and the driven part for changing the transmission ratio of the motive force applied from the driving part to the driven part. The planetary gear mechanism comprises a sun gear installed about the shaft, an output gear for transmitting motive force to the driven part, a frame part installed about the shaft and coupled to the driving part, and a planetary gear rotatably coupled to the frame part and disposed between the sun gear and the output gear for engaging the sun gear and the output gear. A clutch comprising a roller is disposed at an intermediate point along the transmission path between the driving part and the driven part for transmitting the motive force from the driving part to the driven part in one direction only. A first clutch of this type may be disposed between the output gear and the driven part, and a second clutch of this type may be disposed between the frame part and the driven part for directly coupling the frame part to the driven part. In another embodiment of the invention, the planetary gear mechanism further includes a switching unit for selectively coupling the frame part to the driving part and decoupling the frame part form the driving part In this embodiment, a first clutch of the above type may be disposed between the output gear and the driven part, a second clutch of the above type may be disposed between the frame part and the driven part, and a third clutch of the above type may be disposed between the driving part and the output gear.

64 Claims, 5 Drawing Sheets ically mounted bicycle transmission which minimizes the noise generated during idle running of the transmission, which makes smooth transitions from the idle running state to the engaged state, and which makes smooth transitions from one speed to

INTERNALLY MOUNTED BICYCLE TRANSMISSION USING ROLLER CLUTCHES

This application is a division of copending application Ser. No. 08/430,835 filed Apr. 28,1995, now U.S. Pat. No. 5,785,625.

BACKGROUND OF THE INVENTION

The present invention is directed to internally mounted bicycle transmissions and, more particularly, to an internally mounted bicycle transmission which employs roller clutches in the transmission path Internally mounted bicycle transmissions are installed inside the hub shell of the rear wheel of the bicycle and have the following main parts: (a) a fixed shaft which is fastened to the frame of the bicycle, (b) a planetary gear mechanism, (c) one-way clutches, and (d) an operating part. The planetary gear mechanism used in an internally mounted bicycle transmission with a conventional four-speed gear is constructed from (a) three sun gears which are installed around the outer circumference of the fixed shaft, (b) planetary gears which engage with the respective sun gears, and (c) a ring gear which engages with the planetary gears. The respective sun gears can be selectively coupled with the fixed shaft by means of the operating part. The planetary gears are supported by a gear frame which is installed on the outer circumference of the fixed shaft. In addition, respective one-way clutches are installed between the ring gear and the hub shell, and between the gear frame and the hub shell. The transmission ratio is altered by using the operating part to select that sun gear that is coupled to the fixed shaft. When no sun gear is coupled to the fixed shaft, the gear frame and the hub shell are coupled directly to each other.

Conventional one-way clutches used in internally mounted bicycle transmissions have a multiple number of ratchet pawl members which are installed (e.g.) between the ring gear and the hub shell. These ratchet pawl members are ordinarily long, slender members which pivot about one end. By pivoting and engaging with ratchet teeth on the hub shell, these ratchet pawl members transmit the motive force in one direction only.

In the case of idle rotation in the opposite direction from the direction of engagement, the ratchet pawl members pivot and strike the hub shell so that an impact sound is generated. This creates a significant amount of noise. Thereafter, when the system shifts from an idle state to an engaged state, it takes time for the ratchet pawl members to engage with the ratchet teeth, since the amount of play is relatively large. Moreover, since the ratchet pawl members and ratchet teeth engage abruptly, there is a considerable shock instead of a smooth transition. The same is true in the case of changing speeds. Thus, the switching of the one-way clutch cannot be performed in a smooth manner. This is especially true in the case of speed reduction where the pedals must be turned faster after the speed change than before the speed change. The amount of play seems to the cyclist to be amplified by the difference in the transmission ratio, thus aggravating the feeling of a lack of smoothness during the speed change.

SUMMARY OF THE INVENTION

The present invention is directed to an internally mounted bicycle transmission which minimizes the noise generated during idle running of the transmission, which makes smooth transitions from the idle running state to the engaged state, and which makes smooth transitions from one speed to the next. All of these advantages are obtained using simple and inexpensive mechanisms.

In one embodiment of the present invention, an internally mounted bicycle transmission comprises a shaft, a hub rotatably mounted about the shaft, a gear rotatably mounted about the shaft, a driving member coupled to the gear, and a clutch disposed between the driving member and the hub. The clutch comprises an internal member coupled to the driven member and an external member coupled to the hub. The internal member and the external member are adapted to move relative to each other, and a surface of the internal member and a surface of the external member define a space so that a width of the space varies from a wider portion to a narrower portion. A roller disposed in the space so that, when the roller is disposed in the narrower portion of the space, the roller contacts the surfaces of both the external member and internal member for inhibiting movement of the external member and internal member relative to each other. When the roller is disposed in the wider portion of the space, the internal member may move relative to the external member. The roller moves between the narrower and wider portions of the space to effect the transmission function A biasing means may be provided to bias the roller toward the narrower portion of the space to minimize play during operation.

In a more detailed embodiment of the present invention, the bicycle transmission comprises a shaft, a driving part supported about the shaft for coupling to the input part, a driven part supported about the shaft for coupling to the output part, and a planetary gear mechanism disposed between the driving part and the driven part for changing the transmission ratio of the motive force applied from the driving part to the driven part. The planetary gear mechanism comprises a sun gear installed about the shaft, an output gear for transmitting motive force to the driven part, a frame part installed about the shaft and coupled to the driving part, and a planetary gear rotatably coupled to the frame part and disposed between the sun gear and the output gear for engaging the sun gear and the output gear. A clutch comprising a roller is disposed at an intermediate point along the transmission path between the driving part and the driven part for transmitting the motive force from the driving part to the driven part in one direction only. A first clutch of this type may be disposed between the output gear and the driven part, and a second clutch of this type may be disposed between the frame part and the driven part for directly coupling the frame part to the driven part.

In another embodiment of the present invention, the planetary gear mechanism further comprises a switching unit for selectively coupling the frame part to the driving part and decoupling the frame part form the driving part. In this embodiment, a first clutch of the above type may be disposed between the output gear and the driven part, a second clutch of the above type may be disposed between the frame part and the driven part, and a third clutch of the above type may be disposed between the driving part and the output gear.

In each embodiment, the clutch may comprise internal and external rings disposed about the shaft and adapted to rotate relative to each other. A surface of the internal ring and a surface of the external ring define a plurality of the spaces described above, each of which contains a roller. The plurality of rollers may be commonly held within a holding device, and a spring may be attached to the holding device to bias the plurality of rollers towards the narrower portions of their associated spaces. The rings may be formed as one piece with the driving part, the frame part, and/or the driven part to further simplify the structure.

Since the motive force from the driving part is transmitted to the driven part via roller-type clutches, the impact noise of ratchet and pawl members generated in a conventional one-way clutch during idle running is minimized or eliminated. Since the rollers are biased toward the engaging position, there is very little, if any, play within the clutch mechanism so that shock during the transition from the idle running state to the engaged state and when shifting from one gear to the other is further minimized or eliminated.

DETAILED DESCRIPTION OF THE EMBODIMENTS

Figure 1:
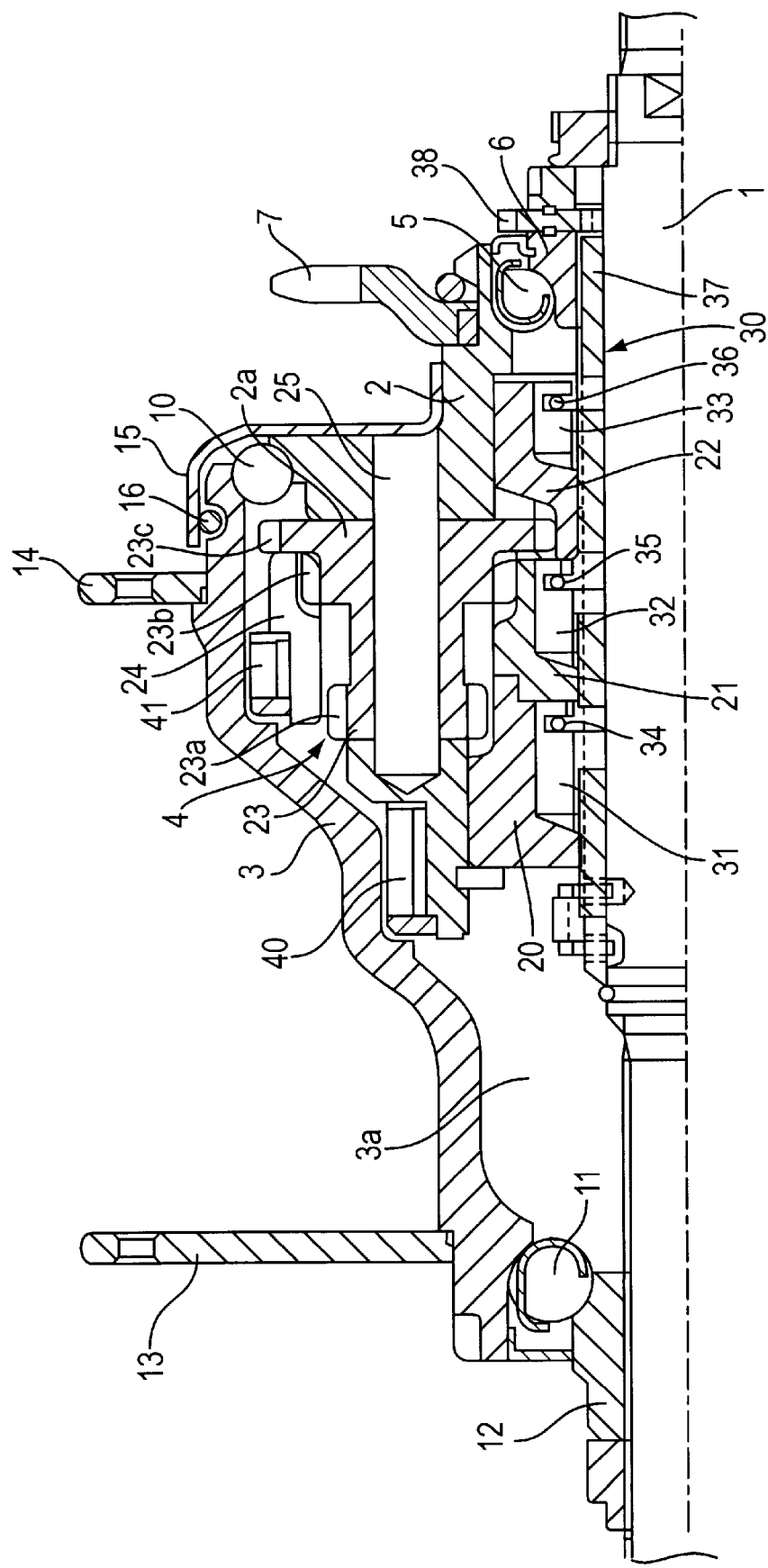
FIG. 1 is a cross sectional view of a particular embodiment of an internally mounted bicycle transmission according to the present invention.

FIG. 1 is a cross sectional view of a particular embodiment of an internally mounted bicycle transmission according to the present invention. The internally mounted speed-change gear shown in FIG. 1 may be mounted, for example in the rear wheel of a bicycle. The main constituents of this device are (a) a fixed shaft (1) which is fastened to the frame of the bicycle, (b) a driving part (2) which is installed around the outer circumference of the fixed shaft (1) at one end of the fixed shaft (1), (c) a hub shell (3) which is installed around the outer circumference of the fixed shaft (1) and driving part (2), and (d) a planetary gear mechanism (4) which is used to transmit a motive force between the driving part (2) and the hub shell (3). This planetary gear mechanism is constructed so that it has a direct linkage and three higher speeds, for a total of four speeds.

The driving part (2) is a roughly cylindrical member, one end of which is supported on the fixed shaft (1) via balls (5) and holders (6) so that the driving part (2) is free to rotate. A chain wheel (7) used as an input part is fastened to the outer circumference of one end of the driving part (2). Cut-out parts (2a) which widen outward in a radial direction from a central space are formed in the driving part (2). These cut-out parts (2a) are formed in three places located at equal angular intervals in the circumferential direction.

The hub shell (3) is a cylindrical member which has a multiple number of step parts in the axial direction; the driving part (2) is accommodated inside the internal accommodating space (3a) of the hub shell (3). One end of the hub shell (3) is supported on the outer circumference of the driving part (2) via balls (10), while the other end of the hub shell (3) is supported on the fixed shaft (1) via balls (11) and holders (12), so that the hub shell (3) is free to rotate. Moreover, flanges (13) and (14) which are used to support spokes are fastened to both ends of the outer-circumferential part of the hub shell (3). A cover (15) is fastened to the outer side wall at one end of the driving part (2). The tip of this cover is extended so that it covers the outer circumferential surface of one end of the hub shell (3). Furthermore, a sealing member (16) is installed between the inner circumferential surface of the tip of the cover (15) and the The planetary gear mechanism (4) is accommodated inside the internal accommodating space (3a) of the hub shell (3). This mechanism (4) has first, second and third sun gears (20), (21) and (22), three planetary gears (23) (only one planetary gear is shown in the figures) which engage with the sun gears, and a ring gear (24). The respective sun gears (20) through (22) are installed in a line in the axial direction on the inner-circumferential part of the driving part (2) around the outer circumference of the fixed shaft (1), and are free to rotate relative to the fixed shaft (1). The planetary gears (23) are supported inside the cut-out parts (2a) of the driving part (2) via supporting pins (25) so that the planetary gears are free to rotate. In each planetary gear (23), a first gear (23a), second gear (23b) and third gear (23c) are formed as an integral unit. The first gear (23a) engages with the first sun gear (20), the second gear (23b) engages with the second sun gear (21), and the third gear (23c) engages with the third sun gear (22). The ring gear (24) is installed around the outer circumferences of the planetary gears (23) and has inner teeth formed on its inside-circumferential part. This ring gear (24) engages with the second gear (23b) of each planetary gear (23).

A selective clutch mechanism (30) which is used to make the respective sun gears (20) through (22) either (i) free to rotate relative to the fixed shaft (1) or (ii) not free to rotate relative to the fixed shaft (1), is installed between the fixed shaft (1) and the respective sun gears (20) through (22). This selective clutch mechanism (30) has the function of selectively coupling any one of the three sun gears (20) through (22) to the fixed shaft (1), and the function of de-coupling any of the sun gears (20) through (22) from the fixed shaft (1). The selective clutch mechanism (30) has (a) a multiple number of pawls (31), (32) and (33) which are installed in the inside-circumferential parts of the respective sun gears (20) through (22), and which are capable of engaging with the inside surfaces of the sun gears (20) through (22), (b) ring-form wire springs (34), (35) and (36) which are used to support the respective pawls (31) through (33), and (c) a sleeve (37). The sleeve (37) is inserted into the outer circumference of the fixed shaft (1), and has a multiple number of engaging grooves formed in its outer circumference. An operating part (38) is fastened to one end of the sleeve (37), so that the sleeve (37) can be caused to rotate by the operation of this operating part (38). The coupling of the respective sun gears (20) through (22) to the fixed shaft (1) is controlled by the rotation of the sleeve (37).

As a result of this construction, a large-step-up motive force transmission path (which has the largest step-up ratio) is formed when the first sun gear (20) is selected, a medium step-up motive force transmission path (which has the second largest step-up ratio) is formed when the second sun gear (21) is selected, and a small-step-up motive force transmission path (which has the smallest step-up ratio) is formed when the third sun gear (22) is selected. When no sun gear is selected, a direct-coupling motive force transmission path is formed.

Figure 2:
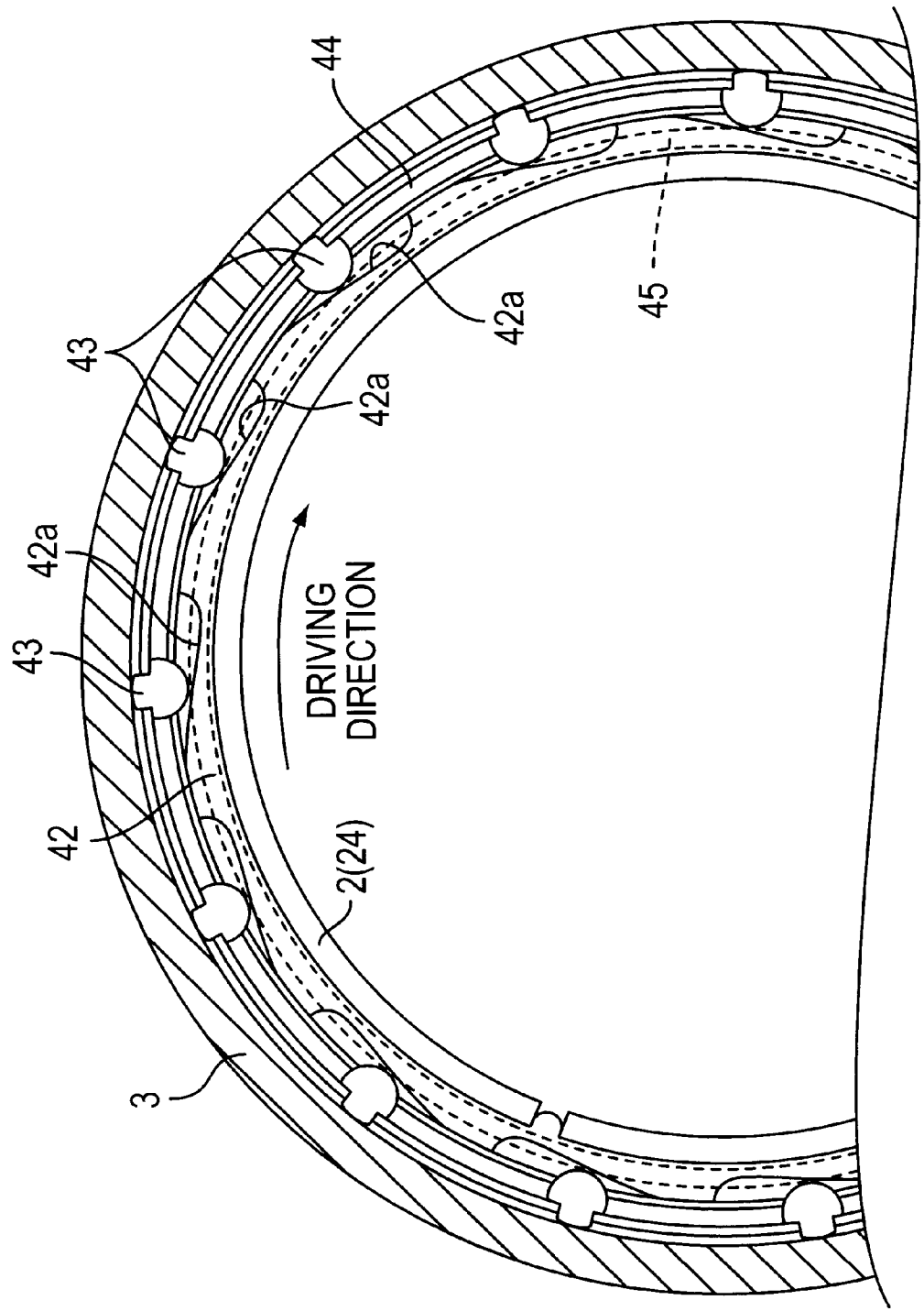
FIG. 2 is a partial cross sectional view of a particular embodiment of the roller clutches used in the internally mounted bicycle transmission according to the present invention.
Figure 3:
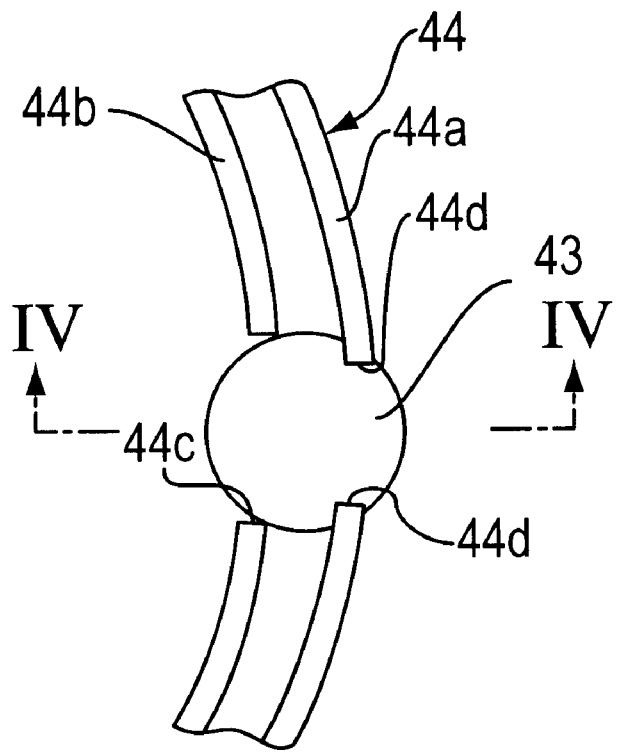
FIG. 3 is a magnified partial view of a particular embodiment of one of the roller clutches shown in FIG. 2.
Figure 4:
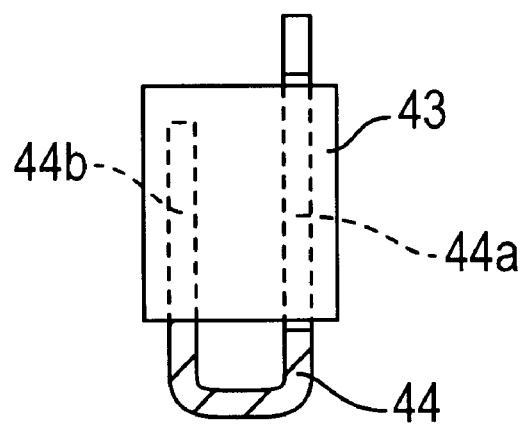
FIG. 4 is a view along line IV—IV in FIG. 3.

A first one-way clutch (40) is installed between the outer circumferential surface of the other end of the driving part (2) and the inner circumferential surface of the hub shell (3), and a second one-way clutch (41) is installed between the outer circumferential surface of the ring gear (24) and the inner circumferential surface of the hub shell (3). As shown in FIG. 2, the first and second one-way clutches (40) and (41) are each equipped with (a) a cam part (42) which is formed as an integral part of the outer circumferential surface of the driving part (2) or the outer circumferential surface of the ring gear (24), (b) a multiple number of rollers (43) which are installed between the cam part (42) and the hub shell (3), (c) a holding device which holds the multiple number of rollers (43), and (d) a torsion spring which drives the holding device (44) in the counterclockwise direction in FIG. 2 (i. e., in the direction of engagement).

Each of the cam parts (42) has a multiple number of cam surfaces (42a) which are inclined in the circumferential direction. These cam surfaces (42a) are formed in positions corresponding to each of the multiple number of rollers (43). When the rollers (43) roll over the cam surfaces (42a), the rollers (43) can rotate freely in the areas which are most inclined toward the inner-circumferential side, i. e., in the areas which are furthest separated from the inner circumferential surface of the hub shell (3). However, at intermediate points along the cam surfaces (42a) with respect to the circumferential direction, the rollers (43) are clamped between the hub shell (3) and the cam surfaces (42a), so that the rotation of the cam part (42) can be transmitted to the hub shell (3).

Figure 5:
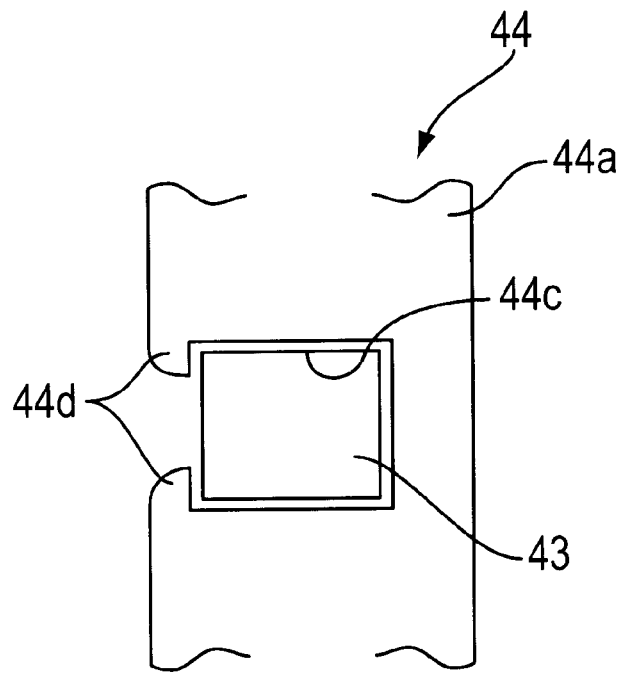
FIG. 5 is a partial plan view of a particular embodiment of one of the roller clutches shown in FIG. 3.
Figure 6:
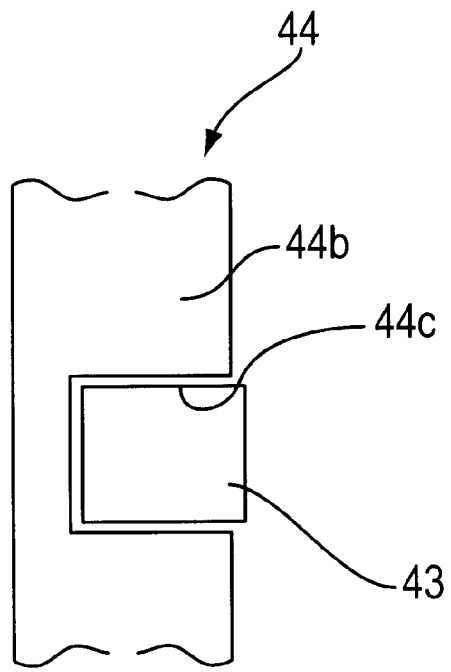
FIG. 6 is a partial view of a particular embodiment of one of the roller clutches shown in FIG. 3 from the inside circumference.

As is shown in FIGS. 3 through 6, the holding device (44) is U-shaped in cross section, and has a first holding part (44a) and a second holding part (44b). Holding cut-out parts (44c) are formed in the respective holding parts (44a) and (44b) at equal angular intervals in the circumferential direction, and the rollers (43) are held in these cut-out parts (44c). The opening dimensions of the cut-out parts (44c) formed in the respective holding parts (44a) and (44b) are set so that they are smaller than the diameter of the rollers (43). As a result, the rollers (43) cannot slip out of the holding device (44) to the outside or inside. Furthermore, as is shown in FIG. 5, a pair of engaging parts (44d) which engage with the end part of each roller (43) are formed on the rims of the cut-out parts (44c) in the first holding part (44a). These engaging parts (44d) prevent the rollers (43) from slipping out of the holding device (44) in the axial direction.

As is shown in FIG. 2, the torsion spring (45) is a coil spring consisting of approximately two turns whose coil diameter is roughly the same as the diameter of the cam surfaces (42a). One end of this torsion spring (45) is fastened to the cam part (42), while the other end is fastened to the holding device (44). As a result of this construction, all of the multiple number of rollers (43) can be driven in the same direction by means of a single torsion spring (45).

Speed changes are accomplished by operating the operating part (38) by means of a wire, thus causing the sleeve (37) to rotate. When the first sun gear (20) is coupled to the fixed shaft (1) by means of the operating part (38), the rotation transmitted to the driving part (2) from the chain wheel (7) is stepped up by the largest step-up ratio, which is determined by the respective numbers of teeth of the first sun gear (20), first and second gears (23a) and (23b) of each planetary gear (23), and ring gear (24). This rotation is then transmitted to the hub shell (3) via the second one-way clutch (41). Meanwhile, when the second sun gear (21) is selected and coupled to the fixed shaft (1), the rotation of the driving part (2) is stepped up by the medium (second largest) step-up ratio, which.is determined by the respective numbers of teeth of the second sun gear (21), second gear (23b) of each planetary gear (23), and ring gear (24). The rotation is then transmitted to the hub shell (3) via the second one-way clutch (41). Furthermore, when the third sun gear (22) is selected and coupled to the fixed shaft (1), the rotation of the driving part (2) is stepped up by the smallest step-up ratio, which is determined by the respective numbers of teeth of the third sun gear (22), third and second gears (23c) and (23b) of each planetary gear (23), and ring gear (24). This rotation is then transmitted to the hub shell (3) via the second one-way clutch (41).

In cases where none of the sun gears (20) through (22) is selected, the rotation of the driving part (2) is transmitted to the hub shell (3) directly via the first one-way clutch (40). The sun gears which are not selected rotate relative to the fixed shaft (1). In cases where any one of the sun gears is selected so that a step-up action is performed by the planetary gear mechanism (4), the driving part (2) and the hub shell (3) rotate relative to each other in such a direction that the first one-way clutch (40) is disengaged.

In the first and second one-way clutches (40) and (41), the rollers are constantly driven in the direction of engagement. Thus, the time lag to clutch engagement is extremely short. Furthermore, since this engagement is performed smoothly, there is little shock during speed-change operations. In addition, since there are no pivoting pawls as in conventional one-way clutches, the noise during idle running is reduced.

In the directly coupled state, as was described above, the first one-way clutch is engaged. In the case of a shift from this state to the small-step-up state, the third sun gear (22) is coupled to the fixed shaft (1). After the third sun gear (22) has thus been coupled, the motive force is output via the second one-way clutch (41). During this speed change, there is a shift from engagement of the first one-way clutch (40) to engagement of the second one way clutch (41), so that there is no idle running state. Accordingly, no especially great shock is felt.

In the case of a shift from the small-step-up or medium-step-up state to the medium-step-up or large-step-up state, the switching of the sun gears is performed with the second one-way clutch (41) maintained in an engaged state. Accordingly, as in the above case, there is no idle running state, so that no especially great shock is felt.

In the case of an internally mounted speed-change gear using conventional ratchet pawl members, the motive force is abruptly transmitted when the pawls engage, so that there is a large shock in the case of a speed increase. As a result, pedaling cannot be smoothly performed. However, in the case of roller type one-way clutches, the motive force is transmitted by a gradual engagement of the rollers with the cam members, so that the motive force is transmitted more gradually than it is in speed-change gears using conventional ratchet pawls. As a result, there is no abrupt application of force to the pedals. Accordingly, the shock is alleviated so that smooth pedaling can be performed during such a speed increase.

In the case of a speed change from the large-step-up state to the medium-step-up state, the sun gear coupled to the fixed shaft (1) is switched from the first sun gear (20) to the second sun gear (21). In this case, if the first one-way clutch (40) were not installed, an idle running state would be created during the period extending from the point in time at which the coupling of the first sun gear (20) to the fixed shaft (1) is released to the point in time at which the second sun gear (21) is coupled to the fixed shaft (1). However, in the present embodiment, since the first one-way clutch (40) is constantly waiting in a state with no play, the first one-way clutch (40) is immediately engaged when the coupling of the first sun gear (20) is released. Then, when the second sun gear (21) is coupled to the fixed shaft (1), the second one-way clutch (41) is engaged, so that the motive force is transmitted to the hub shell (3) via the second one-way clutch (41). In other words, when no sun gear is coupled to the fixed shaft (1) during speed change, the device is in a directly coupled state. Other speed reduction operations are similar; since a shift to lower speeds is always made via the directly coupled state during the switching of the sun gears in the speed change operation, the shock is reduced compared to cases where an idle running state is created.

Both before and after a speed change, the tire ordinarily rotates at approximately the same rotational speed. Accordingly, in cases where pedaling is continued following a speed reduction, driving cannot be applied unless the pedals are turned at a rotational speed which is increased (relative to the speed prior to the speed change) by an amount corresponding to the speed-reduction ratio. Here, the play of the one-way clutch installed on the output part of the planetary gear mechanism (4) corresponds to the idle running distance of the pedals. Accordingly, in cases where a large amount of play is present as in conventional one-way clutches using ratchet pawl members, the idle running distance of the pedals is large. Furthermore, since it is necessary in the case of a change to a lower speed to turn the pedals at a rotational speed which is increased by an amount corresponding to the speed-reduction ratio (as was described above), the idle running distance is increased if pedaling is performed at the same speed. In other words, the play is amplified by an amount corresponding to the speed-reduction. On the other hand, in cases where roller type one-way clutches are used, there is virtually no play in the one-way clutches; accordingly, even in cases where the difference in the rotational speed before and after the speed change is large, there is no amplification of the play as described above. As a result, pedaling can be smoothly performed during speed changes.

Figure 7:
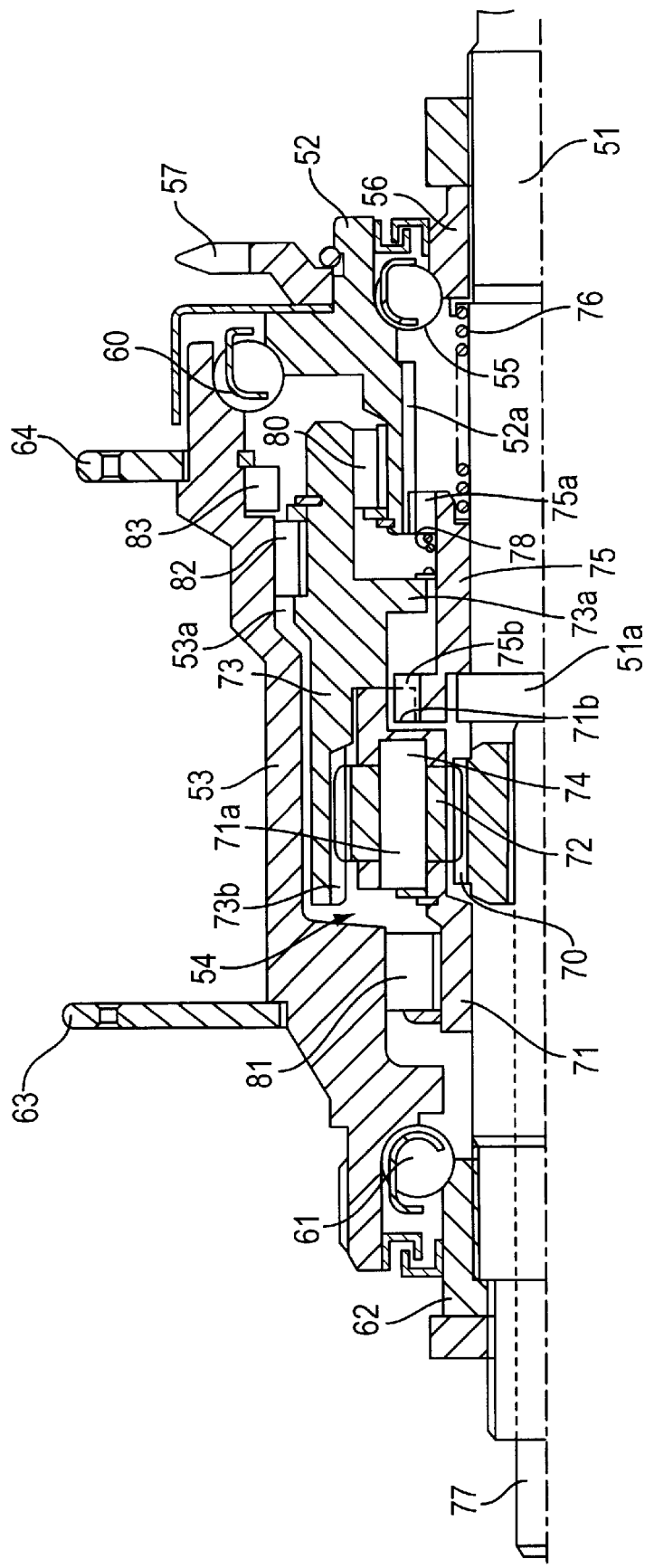
FIG. 7 is a cross sectional view of a another embodiment of an internally mounted bicycle transmission according to the present invention.

FIG. 7 is a cross sectional view of a another embodiment of an internally mounted bicycle transmission according to the present invention. The internally mounted bicycle transmission shown in FIG. 7 has a three-speed construction including directly-coupled, speed-increasing and speed-reducing transmission paths. This speed-change gear may be mounted on the rear wheel of a bicycle as described above. This internally mounted speedchange gear has a construction which is basically the same as that of the first embodiment. The principal parts of the speed-change gear are (a) a fixed shaft (51) which is fastened to the frame of the bicycle, (b) a driving part (52) which is installed around the outer circumference of one end of the fixed shaft (51), (c) a hub shell (53) which is installed around the outer circumference of the fixed shaft (51) and driving part (52), and (d) a planetary gear mechanism (54).

The driving part (52) is supported on the fixed shaft (51) via balls (55) and holders (56) so that the driving part (52) is free to rotate. A chain wheel (57) is fastened to the outer circumference of one end of the driving part (52). A multiple number of guide grooves (52a) are formed in the axial direction in the inner-circumferential part of the other end of the driving part (52).

The hub shell (53) is a cylindrical member. The driving part (52) and planetary gear mechanism (54) are accommodated in the internal accommodating space (53a) of the hub shell (53). The hub shell (53) is supported on the fixed shaft (51) via balls (60, 61) and holders (62) so that the hub shell (53) is free to rotate. Flanges (63) and (64) which are used to support spokes are fastened to both ends of the outer-circumferential part of the hub shell (53).

The planetary gear mechanism (54) has (a) a sun gear (70) which is formed concentrically with and as an integral part of the fixed shaft (51), (b) a frame part (71) which is installed around the outer circumference of the fixed shaft (51), (c) three planetary gears (72) (only one planetary gear is shown in FIG. 7) which engage with the sun gear (70), and (d) a ring gear (73). The frame part (71) is a cylindrical member and is supported so that it is free to rotate relative to the fixed shaft (1). Three cut-out parts (71a) are formed in the frame part (71) in the circumferential direction, and the planetary gears (72) are supported in these cut-out parts (71a) by means of pins (74) so that the planetary gears (72) are free to rotate. Furthermore, a multiple number of engaging recesses (71b) are formed in the innercircumferential part of one end of the frame part (71). The ring gear (73) is formed in a roughly cylindrical shape, and is installed so that it is free to move in the axial direction over the outer circumference of the frame part (71). An inner-circumferential flange part (73a) which projects inward is formed on the central part (with respect to the axial direction) of the inner circumference of the ring gear (73), and inner teeth (73b) are formed on the other side of the ring gear (73). The planetary gears (72) engage with the inner teeth (73b) of the ring gear (73) at the same time that they engage with the sun gear (70) as described above.

A clutch member (75) is installed around the outer circumference of the fixed shaft (51) so that the clutch member (75) is free to move in the axial direction. This clutch member (75) is constantly driven toward the frame part (71) by a spring (76). Guide projections (75a) are formed on the outer circumferential part of one end of the clutch member (75); these guide projections (75a) engage with the guide grooves (52a) so that the guide projections (75a) are free to slide. Furthermore, a multiple number of pawl parts (75b) are formed on the outer circumferential part of the other end of the clutch member (75); these pawl parts (75b) are capable of engaging with the engaging recesses (71b) of the frame part (71). The clutch member (75) is arranged so that it can be moved toward the driving part (52) by a push rod (77) which is installed in the central part of the fixed shaft (51) so that the push rod (77) is free to move in the axial direction. Specifically, the clutch member (75) is coupled to or de-coupled from the frame part (71) by the operation of the push rod (77). A spring (78) is installed between the guide projections (75a) of the clutch member (75) and the inner-circumferential flange part (73a) of the ring gear (73) so that the ring gear (73) is driven toward the frame part (71) by this spring (78).

A third one-way clutch (80) is installed between the outer circumferential surface of the frame-part end of the driving part (52) and the inner circumferential surface of the ring gear (73). A fourth one-way clutch (81) is installed between the outer circumferential surface of the other end of the frame part (71) and the inner circumferential surface of the hub shell (53), and a fifth one-way clutch (82) is installed between the outer circumferential surface of the ring gear (73) and the inner circumferential surface of the hub shell (53). An idle ring (83) is installed at the position where the ring gear (73) ceases to contact the inner circumferential surface of the hub shell (53) when the ring gear (73) moves toward the driving part (52). This idle ring (83) is used in order to prevent the transmission of the motive force from the fifth one-way clutch (82) to the hub shell (53) even when the idle ring (83) is engaged with the fifth one-way clutch (82). The respective one-way clutches (80), (81) and (82)

have the same construction as in the previously described embodiment, with the cam parts of the one-way clutches being formed as integral parts of the outer circumferential surfaces of the driving part (52), frame part (71) and ring gear (73), respectively.

As a result of the above mentioned planetary gear mechanism (54) and one-way clutches (80) through (82), this internally mounted speed-change gear has (a) a speed-increasing motive force transmission path formed by the driving part (52), clutch member (75), frame part (71), planetary gear mechanism (54), ring gear (73) and hub shell (53), (b) a directly coupled motive force transmission path formed by the driving part (52), ring gear (73) and hub shell (53), and (c) a speed-reducing motive force transmission path formed by the driving part (52), ring gear (73), planetary gear mechanism (54), frame part (71) and hub shell (53).

Speed changes are accomplished by operating the push rod (77). In the state shown in FIG. 7, in which the push rod (77) is not pushed in, the rotation from the driving part (52) is stepped up via the speed-increasing motive force transmission path, and is transmitted to the hub shell (53). Specifically, the rotation input into the driving part (52) is transmitted to the frame part (71) via the clutch member (75). The rotation thus transmitted to the frame part (71) is stepped up by a transmission ratio determined by the respective numbers of teeth of the sun gear (70), planetary gears (72) and ring gear (73), and is transmitted to the hub shell (53) via the fifth one-way clutch (82).

Meanwhile, when the push rod (77) is pushed in, the clutch member (75) is also moved toward the driving part (52) via the flange part (51a) of the fixed shaft (51). As a result, the pawl parts (75b) of the clutch member (75) slip out of the engaging recesses (71b) of the frame part (71). In this state, the rotation from the driving part (52) is transmitted directly to the hub shell (53) via the directly coupled motive force transmission path. In other words, the rotation input into the driving part (52) is transmitted to the ring gear (73) via the third one-way clutch (80), and is further transmitted to the hub shell (53) via the fifth one-way clutch (82).

When the push rod (77) is pushed in even further from the directly coupled state, the clutch member (75) is pushed even further toward the driving part (52); as a result, the pawl parts (75b) of the clutch member (75) push the inner-circumferential flange part (73a) of the ring gear (73) so that the ring gear (73) is caused to move toward the driving part (52). Accordingly, the fifth one-way clutch (82) installed around the outer circumference of the ring gear (73) engages with the idle ring (83). In this state, the fifth one-way clutch (82) does not transmit the motive force; as a result, the rotation from the driving part (52) is stepped down via the speed-reducing motive force transmission path, and is then transmitted to the hub shell (53). In other words, the rotation input into the driving part (52) is transmitted to the ring gear (73) via the third one-way clutch (80), and is then further transmitted to the hub shell (53) via the planetary gear mechanism (54), frame part (71) and fourth one-way clutch (81). In this case, the input rotation is stepped down by a transmission ratio determined by the respective numbers of teeth of the sun gear (70), planetary gears (72) and ring gear (73).

In the case of a speed change from the speed-increasing path to direct coupling, or from direct coupling to the speed-reducing path, a directly coupled state is maintained without any idle running state being generated. Thus, the shock is reduced as in the case of the previously described embodiment More specifically, in the case of a speed change from the speed-increasing path to direct coupling, the engagement of the clutch member (75) with the frame part (71) is released. In this case, there is a shift from engagement of the fourth one-way clutch (81) to engagement of the fifth one-way clutch (82). When the clutch member (75) is released from the frame part (71), the third one-way clutch (80), which is in a waiting state with no play, engages immediately. Accordingly, the motive force from the driving part (52) is transmitted to the hub shell (53) via the ring gear (73) and fifth one-way clutch (82).

In the case of a speed change from direct coupling to the speed-reducing path, the engagement of the fifth one-way clutch (82) with the hub shell (53) is released, and there is a shift to the engagement of the fourth one-way clutch (81). In this case, even though the engagement of the fifth one-way clutch (82) is released, the fourth one-way clutch (81) is constantly in a waiting state with no play, and therefore engages immediately so that no idle running state is created.

While the above is a description of various embodiments of the present invention, various modifications may be employed. For example, the construction of the switching means is not limited to the constructions described in the respective embodiments above; various modifications are possible. Similarly, the planetary gear mechanism may also be constructed in various ways. For example, it would also be possible to construct the planetary gear mechanism from two planetary gear units installed side by side on the left and right, and to installed a roller type one-way clutch between these planetary gear units. In this case, the respective planetary gear units would be constructed from sun gears, planetary gears and a ring gear as in the previously described embodiments. Accordingly, the invention should not be limited by the specific embodiments described. Instead, the true scope of the invention should be determined from the following claims.

What is claimed is:

1. A bicycle transmission for transmitting a motive force comprising:
   a shaft;
   a driving part supported about the shaft for applying the motive force;
   a driven part supported about the shaft for receiving the motive force from the driving part;
   a planetary gear mechanism disposed between the driving part and the driven part for changing the transmission ratio of the motive force applied from the driving part to the driven part;
   a first clutch comprising a roller disposed at an intermediate point along the transmission path between the driving part and the driven part for transmitting the motive force from the driving part to the driven part in one direction only;
   wherein the planetary gear mechanism comprises:
   (i) a sun gear concentrically mounted on the shaft for rotation therewith;
   (ii) an output gear for transmitting motive force to the driven part;
   (iii) a frame part installed about the shaft;
   (iv) a planetary gear rotatably coupled to the frame part and disposed between the sun gear and the output gear for engaging the sun gear and the output gear;
   (v) a switching unit for selectively coupling the frame part to the driving part and decoupling the frame part from the driving part; and wherein the first clutch is disposed between the output gear and the driven part.

2. A bicycle transmission for transmitting a motive force comprising:

a shaft;

a driving part supported about the shaft for applying the motive force;

a driven part supported about the shaft for receiving the motive force from the driving part;

a planetary gear mechanism disposed between the driving part and the driven part for changing the transmission ratio of the motive force applied from the driving part to the driven part;

a first clutch comprising a roller disposed at an intermediate point along the transmission path between the driving part and the driven part for transmitting the motive force from the driving part to the driven part in one direction only;

wherein the planetary gear mechanism comprises:
  (i) a sun gear concentrically mounted on the shaft for rotation therewith;
  (ii) an output gear for transmitting motive force to the driven part;
  (iii) a frame part installed about the shaft;
  (iv) a planetary gear rotatably coupled to the frame part and disposed between the sun gear and the output gear for engaging the sun gear and the output gear;
  (v) a switching unit for selectively coupling the frame part to the driving part and decoupling the frame part from the driving part; and wherein the first clutch is disposed between the driving part and the output gear.

3. A bicycle transmission for transmitting a motive force comprising:

a shaft;

a driving part supported about the shaft for applying the motive force;

a driven part supported about the shaft for receiving the motive force from the driving part;

a planetary gear mechanism disposed between the driving part and the driven part for changing the transmission ratio of the motive force applied from the driving part to the driven part;

a first clutch comprising a roller disposed at an intermediate point along the transmission path between the driving part and the driven part for transmitting the motive force from the driving part to the driven part in one direction only;

wherein the planetary gear mechanism comprises:
  (i) a sun gear concentrically mounted on the shaft for rotation therewith;
  (ii) an output gear for transmitting motive force to the driven part;
  (iii) a frame part installed about the shaft;
  (iv) a planetary gear rotatably coupled to the frame part and disposed between the sun gear and the output gear for engaging the sun gear and the output gear;
  (v) a switching unit for selectively coupling the frame part to the driving part and decoupling the frame part from the driving part;

wherein the first clutch is disposed between the frame part and the driven part; and a second clutch comprising a roller disposed between the driving part and the output gear.

4. A bicycle transmission for transmitting a motive force comprising:

a shaft;

a driving part supported about the shaft for applying the motive force;

a driven part supported about the shaft for receiving the motive force from the driving part;

a planetary gear mechanism disposed between the driving part and the driven part for changing the transmission ratio of the motive force applied from the driving part to the driven part;

a first clutch comprising a roller disposed at an intermediate point along the transmission path between the driving part and the driven part for transmitting the motive force from the driving part to the driven part in one direction only;

wherein the planetary gear mechanism comprises:
  (i) a sun gear concentrically mounted on the shaft for rotation therewith;
  (ii) an output gear for transmitting motive force to the driven part;
  (iii) a frame part installed about the shaft;
  (iv) a planetary gear rotatably coupled to the frame part and disposed between the sun gear and the output gear for engaging the sun gear and the output gear;
  (v) a switching unit for selectively coupling the frame part to the driving part and decoupling the frame part from the driving part; and wherein the first clutch is disposed between the output gear and the driven part;

wherein a second clutch comprising a roller is disposed between the frame part and the driven part for transmitting the motive force from the frame part to the driven part in one direction only; and wherein a third clutch comprising a roller is disposed between the driving part and the output gear for transmitting the motive force from the driving part to the output gear in one direction only.

5. The transmission according to claim 1 wherein the first clutch comprises:

an internal member coupled to the output gear;

an external member coupled to the driven part;

wherein the internal member and the external member are adapted to move relative to each other;

wherein a surface of the internal member and a surface of the external member define a space so that a width of the space varies from a wider portion to a narrower portion;

a roller disposed in the space;

wherein, when the roller is disposed in the narrower portion of the space, the roller contacts the surfaces of both the external member and internal member for inhibiting movement of the external member and internal member relative to each other; and wherein, when the roller is disposed in the wider portion of the space, the internal member may move relative to the external member.

6. The transmission according to claim 5 wherein the first clutch further comprises biasing means for biasing the roller toward the narrower portion of the space.

7. The transmission according to claim 6 wherein the biasing means comprises a spring which constantly biases the roller toward the narrower portion of the space.

8. The transmission according to claim 5 wherein the internal member is formed as one piece with the output gear.

9. The transmission according to claim 8 wherein the external member is formed as one piece with the driven part.

10. The transmission according to claim 5 wherein the internal member comprises an internal ring disposed about the shaft, wherein the external member comprises an external ring disposed about the shaft, wherein the internal ring and the external ring are adapted to rotate relative to each other, wherein a surface of the internal ring and a surface of the external ring define a plurality of the spaces, and further comprising a plurality of the rollers, wherein a roller is disposed in each space.

11. The transmission according to 10 claim wherein the internal ring is formed as one piece with the output gear.

12. The transmission according to claim 11 wherein the external ring is formed as one piece with the driven part.

13. The transmission according to claim 10 further comprising biasing means for biasing each of the plurality of rollers toward the narrower portion of its associated space.

14. The transmission according to claim 13 wherein the biasing means comprises a holding device having a plurality of receptacles for retaining the plurality of rollers.

15. The transmission according to claim 14 wherein the biasing means further comprises a spring coupled to the holding device for constantly biasing the holding device so that each of the plurality of rollers is biased toward the narrower portion of its associated space.

16. The transmission according to claim 15 wherein the internal ring is formed as one piece with the output gear.

17. The transmission according to claim 16 wherein the external ring is formed as one piece with the driven part.

18. The transmission according to claim 17 wherein the output gear comprises a ring gear that is movable axially about the shaft and which moves axially together with the plurality of first rollers, wherein the switching unit comprises:
- a clutch member that is movable axially about the shaft so that:
  - (i) the clutch member couples the frame part to the driving part when the clutch member is in a first axial position;
  - (ii) the clutch member decouples the frame part from the driving part when the clutch member is in a second axial position; and
  - (iii) the clutch member moves the ring gear axially to decouple the plurality of first rollers from the driven member when the clutch member is in a third position; and further comprising
- clutch member moving means for moving the clutch member to the first, second, and third positions.

19. The transmission according to claim 18 wherein the clutch member moving means comprises a push rod disposed within the shaft for engaging the clutch member.

20. The transmission according to claim 2 wherein the first clutch comprises:
- an internal member coupled to the driving part;
- an external member coupled to the output gear;
- wherein the internal member and the external member are adapted to move relative to each other;
- wherein a surface of the internal member and a surface of the external member define a space so that a width of the space varies from a wider portion to a narrower portion;
- a roller disposed in the space;
- wherein, when the roller is disposed in the narrower portion of the space, the roller contacts the surfaces of both the external member and internal member for inhibiting movement of the external member and internal member relative to each other; and
- wherein, when the roller is disposed in the wider portion of the space, the internal member may move relative to the external member.

21. The transmission according to claim 20 wherein the first clutch further comprises biasing means for biasing the roller toward the narrower portion of the space.

22. The transmission according to claim 21 wherein the biasing means comprises a spring which constantly biases the roller toward the narrower portion of the space.

23. The transmission according to claim 20 wherein the internal member is formed as one piece with the driving member.

24. The transmission according to claim 23 wherein the external member is formed as one piece with the output gear.

25. The transmission according to claim 20 wherein the internal member comprises an internal ring disposed about the shaft, wherein the external member comprises an external ring disposed about the shaft, wherein the internal ring and the external ring are adapted to rotate relative to each other, wherein a surface of the internal ring and a surface of the external ring define a plurality of the spaces, and further comprising a plurality of the rollers, wherein a roller is disposed in each space.

26. The transmission according to claim 25 wherein the internal ring is formed as one piece with the driving member.

27. The transmission according to claim 26 wherein the external ring is formed as one piece with the output gear.

28. The transmission according to claim 25 further comprising biasing means for biasing each of the plurality of rollers toward the narrower portion of its associated space.

29. The transmission according to claim 28 wherein the biasing means comprises a holding device having a plurality of receptacles for retaining the plurality of rollers.

30. The transmission according to claim 29 wherein the biasing means further comprises a spring coupled to the holding device for constantly biasing the holding device so that each of the plurality of rollers is biased toward the narrower portion of its associated space.

31. The transmission according to claim 30 wherein the internal ring is formed as one piece with the driving member.

32. The transmission according to claim 31 wherein the external ring is formed as one piece with the output gear.

33. The transmission according to claim 32 wherein the output gear comprises a ring gear that is movable axially about the shaft and which moves axially together with the plurality of first rollers, wherein the switching unit comprises:
- a clutch member that is movable axially about the shaft so that:
  - (i) the clutch member couples the frame part to the driving part when the clutch member is in a first axial position;
  - (ii) the clutch member decouples the frame part from the driving part when the clutch member is in a second axial position; and
  - (iii) the clutch member moves the ring gear axially to decouple the plurality of first rollers from the driven member when the clutch member is in a third position; and further comprising
- clutch member moving means for moving the clutch member to the first, second, and third positions.

34. The transmission according to claim 33 wherein the clutch member moving means comprises a push rod disposed within the shaft for engaging the clutch member.

35. The transmission according to claim 3 wherein the first clutch comprises:

an internal member coupled to the frame part;
an external member coupled to the driven part;
wherein the internal member and the external member are adapted to move relative to each other;
wherein a surface of the internal member and a surface of the external member define a space so that a width of the space varies from a wider portion to a narrower portion;
a roller disposed in the space;
wherein, when the roller is disposed in the narrower portion of the space, the roller contacts the surfaces of both the external member-and internal member for inhibiting movement of the external member and internal member relative to each other; and
wherein, when the roller is disposed in the wider portion of the space, the internal member may move relative to the external member.

36. The transmission according to claim 35 wherein the first clutch further comprises biasing means for biasing the roller toward the narrower portion of the space.

37. The transmission according to claim 36 wherein the biasing means comprises a spring which constantly biases the roller toward the narrower portion of the space.

38. The transmission according to claim 35 wherein the internal member is formed as one piece with the frame part.

39. The transmission according to claim 38 wherein the external member is formed as one piece with the driven part.

40. The transmission according to claim 35 wherein the internal member comprises an internal ring disposed about the shaft, wherein the external member comprises an external ring disposed about the shaft, wherein the internal ring and the external ring are adapted to rotate relative to each other, wherein a surface of the internal ring and a surface of the external ring define a plurality of the spaces, and further comprising a plurality of the rollers, wherein a roller is disposed in each space.

41. The transmission according to claim 40 wherein the internal ring is formed as one piece with the frame part.

42. The transmission according to claim 41 wherein the external ring is formed as one piece with the driven part.

43. The transmission according to claim 40 further comprising biasing means for biasing each of the plurality of rollers toward the narrower portion of its associated space.

44. The transmission according to claim 43 wherein the biasing means comprises a holding device having a plurality of receptacles for retaining the plurality of rollers.

45. The transmission according to claim 44 wherein the biasing means further comprises a spring coupled to the holding device for constantly biasing the holding device so that each of the plurality of rollers is biased toward the narrower portion of its associated space.

46. The transmission according to claim 45 wherein the internal ring is formed as one piece with the frame part.

47. The transmission according to claim 46 wherein the external ring is formed as one piece with the driven part.

48. The transmission according to claim 47 wherein the output gear comprises a ring gear that is movable axially about the shaft and which moves axially together with the plurality of first rollers, wherein the switching unit comprises:
a clutch member that is movable axially about the shaft so that:
 (i) the clutch member couples the frame part to the driving part when the clutch member is in a first axial position;
 (ii) the clutch member decouples the frame part from the driving part when the clutch member is in a second axial position; and
 (iii) the clutch member moves the ring gear axially to decouple the plurality of first rollers from the driven member when the clutch member is in a third position; and further comprising
clutch member moving means for moving the clutch member to the first, second, and third positions.

49. The transmission according to claim 48 wherein the clutch member moving means comprises a push rod disposed within the shaft for engaging the clutch member.

50. The transmission according to claim 4 wherein the first clutch comprises:
a first internal member coupled to the output gear;
a first external member coupled to the driven part;
wherein the first internal member and the first external member are adapted to move relative to each other;
wherein a surface of the first internal member and a surface of the first external member define a first space so that a width of the first space varies from a wider portion to a narrower portion;
a first roller disposed in the first space;
wherein, when the first roller is disposed in the narrower portion of the first space, the first roller contacts the surfaces of both the first external member and first internal member for inhibiting movement of the first external member and first internal member relative to each other; and
wherein, when the first roller is disposed in the wider portion of the first space, the first internal member may move relative to the first external member.
wherein the second clutch comprises:
a second internal member coupled to the frame part;
a second external member coupled to the driven part;
wherein the second internal member and the second external member are adapted to move relative to each other;
wherein a surface of the second internal member and a surface of the second external member define a second space so that a width of the second space varies from a wider portion to a narrower portion;
a second roller disposed in the second space;
wherein, when the second roller is disposed in the narrower portion of the second space, the second roller contacts the surfaces of both the second external member and second internal member for inhibiting movement of the second external member and second internal member relative to each other; and
wherein, when the second roller is disposed in the wider portion of the second space, the second internal member may move relative to the second external member; wherein the third clutch comprises:
a third internal member coupled to the driving part;
a third external member coupled to the output gear;
wherein the third internal member and the third external member are adapted to move relative to each other;
wherein a surface of the third internal member and a surface of the third external member define a third space so that a width of the third space varies from a wider portion to a narrower portion;
a third roller disposed in the third space;
wherein, when the third roller is disposed in the narrower portion of the third space, the third roller contacts the surfaces of both the third external member and third internal member for inhibiting movement of the third external member and third internal member relative to each other; and wherein, when the third roller is disposed in the wider portion of the third space, the third internal member may move relative to the third external member.

51. The transmission according to claim 50 wherein the first clutch further comprises first biasing means for biasing the first roller toward the narrower portion of the first space, wherein the second clutch further comprises second biasing means for biasing the second roller toward the narrower portion of the second space, and wherein the third clutch further comprises third biasing means for biasing the third roller toward the narrower portion of the third space.

52. The transmission according to claim 51 wherein the first biasing means comprises a first spring which constantly biases the first roller toward the narrower portion of the first space, and wherein the second biasing means comprises a second spring which constantly biases the second roller toward the narrower portion of the second space, and wherein the third biasing means comprises a third spring which constantly biases the third roller toward the narrower portion of the third space.

53. The transmission according to claim 50 wherein the first internal member is formed as one piece with the output gear, wherein the second internal member is formed as one part with the frame part, and wherein the third internal member is formed as one part with the driving part.

54. The transmission according to claim 53 wherein the first and second external members are both formed as one piece with the driven part, and wherein the third external member is formed as one piece with the output gear.

55. The transmission according to claim 50 wherein the first internal member comprises a first internal ring disposed about the shaft, wherein the first external member comprises a first external ring disposed about the shaft, wherein the first internal ring and the first external ring are adapted to rotate relative to each other, wherein a surface of the first internal ring and a surface of the first external ring define a plurality of the first spaces, and further comprising a plurality of the first rollers, wherein a first roller is disposed in each first space; and wherein the second internal member comprises a second internal ring disposed about the shaft, wherein the second external member comprises a second external ring disposed about the shaft, wherein the second internal ring and the second external ring are adapted to rotate relative to each other, wherein a surface of the second internal ring and a surface of the second external ring define a plurality of the second spaces, and further comprising a plurality of the second rollers, wherein a second roller is disposed in each second space; and wherein the third internal member comprises a third internal ring disposed about the shaft, wherein the third external member comprises a third external ring disposed about the shaft, wherein the third internal ring and the third external ring are adapted to rotate relative to each other, wherein a surface of the third internal ring and a surface of the third external ring define a plurality of the third spaces, and further comprising a plurality of the third rollers, wherein a third roller is disposed in each third space.

56. The transmission according to claim 55 wherein the first internal ring is formed as one piece with the output gear, wherein the second internal ring is formed as one piece with the frame part, and wherein the third internal ring is formed as one piece with the driving member.

57. The transmission according to claim 56 wherein the first and second external rings are both formed as one piece with the driven part, and wherein the third external ring is formed as one piece with the output gear.

58. The transmission according to claim 55 further comprising:

first biasing means for biasing each of the plurality of first rollers toward the narrower portion of its associated first space;

second biasing means for biasing each of the plurality of second rollers toward the narrower portion of its associated second space; and third biasing means for biasing each of the plurality of third rollers toward the narrower portion of its associated third space.

59. The transmission according to claim 58 wherein the first biasing means comprises a first holding device having a plurality of first receptacles for retaining the plurality of first rollers, wherein the second biasing means comprises a second holding device having a plurality of second receptacles for retaining the plurality of second rollers, and wherein the third biasing means comprises a third holding device having a plurality of third receptacles for retaining the plurality of third rollers.

60. The transmission according to claim 59 wherein the first biasing means further comprises a first spring coupled to the first holding device for constantly biasing the first holding device so that each of the plurality of first rollers is biased toward the narrower portion of its associated first space, wherein the second biasing means further comprises a second spring coupled to the second holding device for constantly biasing the second holding device so that each of the plurality of second rollers is biased toward the narrower portion of its associated second space, and wherein the third biasing means further comprises a third spring coupled to the third holding device for constantly biasing the third holding device so that each of the plurality of third rollers is biased toward the narrower portion of its associated third space.

61. The transmission according to claim 60 wherein the first internal ring is formed as one piece with the output gear, wherein the second internal ring is formed as one piece with the frame part, and wherein the third internal ring is formed as one piece with the driving part.

62. The transmission according to claim 61 therein the first and second external rings are both formed as one piece with the driven part, and wherein the third external ring is formed as one part with the output gear.

63. The transmission according to claim 62 wherein the output gear comprises a ring gear that is movable axially about the shaft and which moves axially together with the plurality of first rollers, wherein the switching unit comprises:

a clutch member that is movable axially about the shaft so that:
  (i) the clutch member couples the frame part to the driving part when the clutch member is in a first axial position;
  (ii) the clutch member decouples the frame part from the driving part when the clutch member is in a second axial position; and
  (iii) the clutch member moves the ring gear axially to decouple the plurality of first rollers from the driven member when the clutch member is in a third position; and further comprising clutch member moving means for moving the clutch member to the first, second, and third positions.

64. The transmission according to claim 63 wherein the clutch member moving means comprises a push rod disposed within the shaft for engaging the clutch member.

* * * * *